United States Patent [19]

Snipes

[11] Patent Number: 5,174,595
[45] Date of Patent: Dec. 29, 1992

[54] FOUR WHEEL STEERING MECHANISM
[75] Inventor: Terry L. Snipes, East Moline, Ill.
[73] Assignee: Deere & Company, Moline, Ill.
[21] Appl. No.: 731,594
[22] Filed: Jul. 17, 1991
[51] Int. Cl.$^5$ .............................................. B62D 7/14
[52] U.S. Cl. ........................................ 280/91; 280/99
[58] Field of Search ...................... 280/91, 99; 56/14.7, 56/15.4; 74/496

[56] References Cited

U.S. PATENT DOCUMENTS

| | | | |
|---|---|---|---|
| 2,319,880 | 5/1943 | Pulleyblank | 280/91 |
| 2,354,830 | 8/1944 | Reid | 280/91 |
| 3,596,730 | 8/1971 | Cecce | 180/79.2 R |
| 4,738,459 | 4/1988 | Nakamura et al. | 280/91 |
| 4,977,733 | 12/1990 | Samejima et al. | 56/14.7 |

FOREIGN PATENT DOCUMENTS

| | | | |
|---|---|---|---|
| 242932 | 1/1926 | United Kingdom | 280/91 |
| 489445 | 7/1938 | United Kingdom | 280/91 |

Primary Examiner—Karin L. Tyson

[57] ABSTRACT

A vehicle having a frame and front and rear pairs of wheels that are pivotal to steer the vehicle. A mower deck is operatively carried beneath the vehicle frame and between the front and rear pairs of wheels. A linkage mechanism operatively couples the front and rear pairs of wheels for transmitting pivotal motion therebetween. The linkage mechanism includes a first swing member swingably carried by the frame and coupled with the first rod member for swinging about a vertical axis as the front wheels pivot. A second rod member couples the first swing member with a second swing member that is carried by the frame for pivotal motion about a generally horizontal axis. A third rod member couples the second swing member with the rear pair of wheels. The longitudinal axis of the second rod and the pivot axes of the swing members are arranged at approximately ninety degrees to each other, and thereby provides clearance for other vehicle components located beween the mower deck and the vehicle.

14 Claims, 5 Drawing Sheets

FOUR WHEEL STEERING MECHANISM

BACKGROUND OF THE INVENTION

1. Field of the Invention

The invention relates to small lawn and garden vehicles having four wheel steering.

2. Description of the Related Art

It is known to provide small lawn and garden vehicles such as rider mowers with steerable front wheels and non-pivotable rear driven wheels. As the vehicle executes a turn, the front wheels pivot. The wheels tend to marr or scuff the ground if the axes of rotation of the four wheels do not intersect at a common point. Typically, lawn and garden vehicles such as rider mowers produce a relatively large amount of such steering errors. Also, the minimum turning radius of a vehicle having a two wheel steering mechanisms is relatively large.

Vehicles have been provided with four steerable wheels to thereby decrease the vehicle's minimum turning radius. According to a first type of four wheel steering mechanism, all four wheels are attached to the vehicle by respective pivotal couplings such that each wheel is capable of pivoting about a respective generally vertical axis. An arm is coupled with each pivotal coupling such that as the arm is pivoted the wheel pivots therewith to execute a turn. A tie rod extends between the front pair of arms for pivoting the two front wheels in unison. A similar tie rod extends between the rear pair of arms for pivoting the rear pair of wheels. A linkage is provided between the front and rear pairs of wheels such that all four wheels pivot at once.

When the vehicle is traveling straight forwardly, the tie rods and arms are positioned substantially perpendicular to each other. Therefore, the distance between the tie rod and the vertical axis defined by the pivotal coupling is relatively large, and a relatively large moment arm is produced for swinging the pivotal coupling during initiation of a turn. However, when the vehicle is executing a tight turn, the angle between the tie rods and the arms is relatively small, such that the distance between the tie rods and the vertical axis of the pivotal coupling is relatively small. Only a relatively small moment arm is available for pivoting the wheel during a sharp turn. Therefore, when the vehicle executes a relatively tight turn, a relatively large force must be applied to the tie rods in order to pivot the wheels from this position. Also, the wheels encounter ground forces that tend to urge the wheel to pivot back to an unpivoted or straight-ahead position. The tie rods keep the wheels in the desired pivotal positioned, and therefore the above mentioned ground forces are transmitted to the tie rods. Since the moment arms are relatively small during a tight turn, the forces encountered by the tie rods are relatively large. The tie rods and arms are thereby subjected to relatively large stresses and may fail or break.

Many of these types of four wheel steering mechanisms are designed such that steering errors are reduced only for one direction of turn.

A second type of four wheel steering mechanism provides a front plate pivotally coupled to the vehicle frame at the centerline of the vehicle. A pair of tie rods extend between the front plate and respective front wheels. A similar plate is pivotally coupled to the centerline of the frame at the rear of the vehicle. A linkage is provided that extends between the two plates to cause the plates to pivot simultaneously. The geometry of this type of mechanism allows relatively large lever arms to be maintained throughout even tight turns such that stresses in the tie rods and plates are relatively low. Therefore the likelihood of damaging a tie rod is correspondingly reduced. Furthermore, the symmetry that results from the use of the plates allows the mechanism to be designed such that steering errors are reduced an equal amount for turns in both directions.

Conventional mowing vehicles include a gear box or other means for transmitting rotational power from the vehicle engine to the mower deck. The gear box is often carried by the mower deck and generally beneath the vehicle. Other vehicle components such as the vehicle drive shaft, a PTO shaft for driving implements, and the attachment hardware and draft linkages that couple the mower deck to the vehicle are often positioned beneath the vehicle near the rear portion of the mower deck. Therefore, very little clearance is available for steering linkages to be positioned near the rear portion of the mower deck and beneath the vehicle. Furthermore, conventional mower decks are typically capable of being raised beneath the vehicle to transport positions such that the space between the deck and the vehicle is further reduced. The lack of vertical spacing between the deck and the vehicle is aggrevated by the presence of a laterally extending chute that is defined in the front portion of many conventional decks. A chute is often formed by the front of the deck to allow the grass that has been cut by the various mower blades within the deck to be channeled to one side of the deck for ejection through a discharge opening. The chute portion of the deck is taller and larger than the rear portion of the deck, and therefore, when the deck is raised as for transport the front chute portion of the deck may require a larger amount of space beneath the vehicle than the rear portion of the deck.

The plates and the linkages of the second type of four wheel steer mechanism discussed above tend to occupy a relatively large amount of space beneath the vehicle. In addition, the linkages and plates pivot and shift through a relatively large distance such that they require a relatively large amount of space during operation. These conventional mechanisms therefore may interfere with or prevent a mower deck from being operated beneath the vehicle between the front and rear wheels.

It would therefore be desirable to provide a vehicle with a four wheel steering mechanism that allows a mower deck to operate beneath the vehicle between the front and rear wheels. It would be desirable to provide a four wheel steering mechanism having front and rear pivotal members or plates coupled near the centerline of the vehicle with a pair of tie rods extending from each plate to respective pivotal wheels. It would be desirable for steering errors to be reduced, and stresses in the tie rods to remain relatively low throughout tight turning operations. It would be desirable to provide a linkage that operatively connects the plates, and that occupies only a relatively small amount of space during operation such that a mower deck can be operated beneath the vehicle between the front and rear wheels. In particular, it would be desirable to provide such a mechanism that accomodated the use of a mower deck having a chute formed in the front portion thereof. Furthermore, it would be desirable for such a linkage to be positionable beneath the frame to allow ease of access to the linkage for service. Such a linkage that allowed for the deck to be removed easily would also be desirable.

SUMMARY OF THE INVENTION

The preferred embodiment of the present invention provides a vehicle having a frame and front and rear pairs of wheels for supporting the frame. The front and rear pairs of wheels are pivotal to steer the vehicle. A mower deck is operatively carried beneath the vehicle frame and between the front and rear pairs of wheels. Front and rear center-pivot members are pivotally carried by the frame at respective points located proximate the centerline of the vehicle. A pair of front tie rods extend between the front center-pivot member and respective front wheels for pivoting the front wheels as the front center pivot member pivots. A pair of rear tie rods extend between the rear center-pivot member and respective rear wheels for pivoting the rear wheels as the rear center-pivot member pivots. A linkage mechanism operatively couples the front and rear center-pivot members for transmitting pivotal motion therebetween. The linkage mechanism includes a first rod member coupled with the front pivot member. A first swing member is swingably carried by the frame and is coupled with the first rod member for swinging about a vertical axis as the front center-pivot member pivots. A second rod member couples the first swing member with a second swing member. The second swing member is carried by the frame for pivotal motion about a generally horizontal axis. A third rod member is coupled between the second swing member and the rear center pivot member. The front portion of the second rod is restricted from shifting vertically, since the first swing member pivots about a vertical axis. Therefore, the front portion of the second rod remains in a vertical position that allows sufficient clearance for a chute formed in the front of the deck to be raised to a transport position. Furthermore, the rear portion of the second rod is restricted from shifing laterally, since the second swing member pivots about a laterally extending axis. Therefore, the lateral distance that the rear portion of the second rod shifts through is relatively small such that clearance is provided for vehicle components such as a draft plate and a mower deck gear box.

DESCRIPTION OF THE PREFERRED EMBODIMENT

Figure 1:
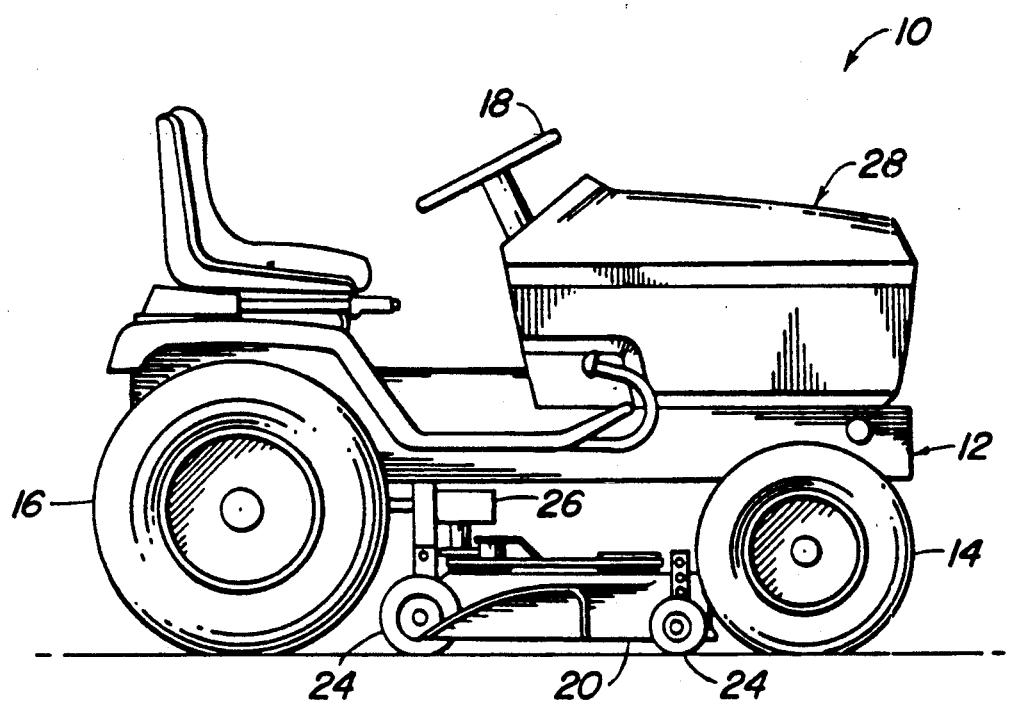
FIG. 1 shows a lawn tractor with which the present invention may be used.

Referring now to FIG. 1, there is shown a vehicle 10 with which the preferred embodiment of the present invention may be used. The vehicle 10 includes a frame 12 and a pair of front wheels 14. A pair of driven rear wheels 16 are also provided. A steering wheel 18 is located in the operator's station and can be turned by the operator to affect pivoting of the wheels 14 and 16 for steering the vehicle 10. A mower deck 20 within which a blade rotates to cut vegetation is suspended beneath the vehicle 10 between the front and rear wheels 14 and 16. A plurality of anti-scalp wheels 24 are carried by the deck 20 a small distance above the ground for engaging the ground when bumps or ground swells are encountered. The deck 20 is thereby guided up and over ground bumps such that the deck 20 will not gouge the ground and the blade will not scalp the grass. A gear box 26 is positioned beneath the vehicle 10 and above the mower deck 20 for driving the blade within the mower deck 20. A series of belts and pulleys can also be utilized for transmitting rotational power from the engine 28 to the mower blade.

A drive shaft (not shown) extends rearwardly from the engine 28 and generally beneath the frame 12 to a transaxle located between the pair of rear driven wheels 16. A PTO shaft (not shown) extends forwardly from the transaxle and generally beneath the frame 12 for powering the gear box 26 or an implement such as a snow blower or a sweeper that can be coupled to the front of the vehicle 10.

Figure 2:
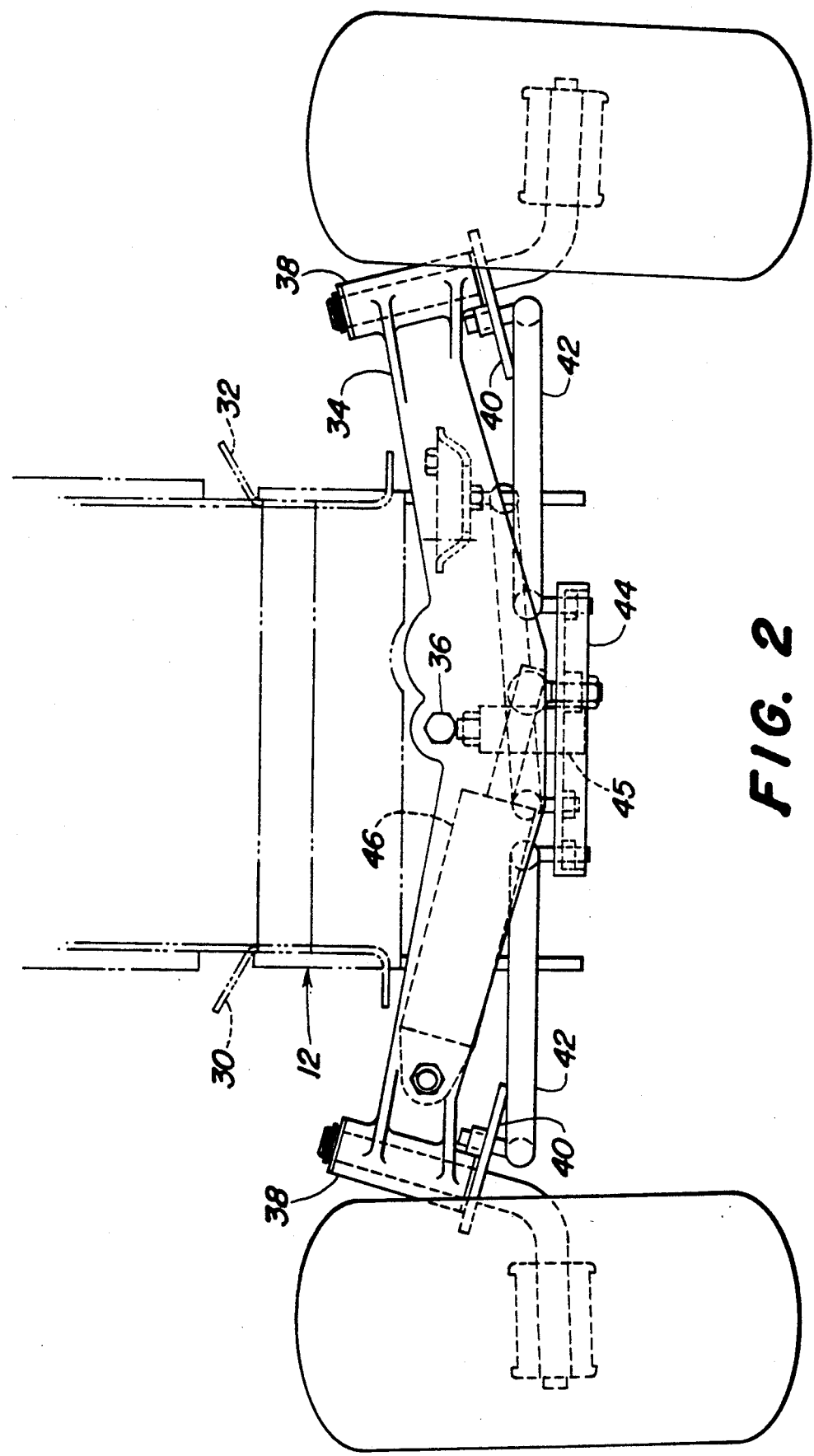
FIG. 2 is a front view of the mechanism that steers the front pair of wheels.
Figure 3:
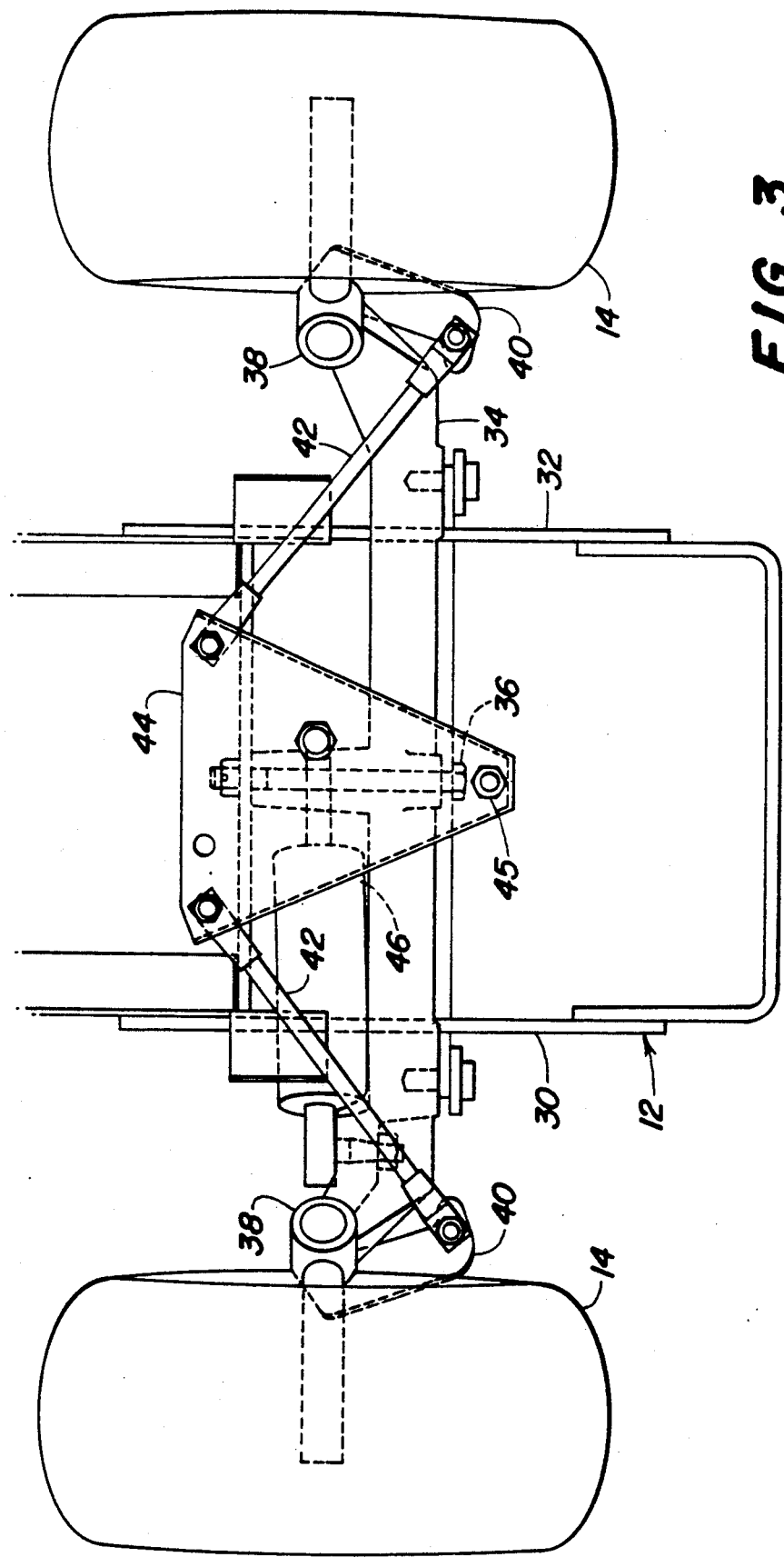
FIG. 3 is a partial plan view of the front portion of the vehicle and the mechanism that steers the front pair of wheels.

Referring now to FIGS. 2 and 3, there is shown the forward portion of the vehicle 10 according to the preferred embodiment of the present invention. The frame 12 includes a pair of longitudinally extending and laterally spaced structural members 30 and 32. An axle 34 is pivotally coupled with the vehicle frame 12 via a bolt connection means 36 and pivotally supports the front pair of wheels 14. As the front wheels 14 encounter sideslopes, the axle 34 can pivot with respect to the frame 12 and about a longitudinal axis to allow the front wheels 14 to remain in contact with the ground. Pivotal wheel support mechanisms 38 having arm members 40 act to steerably couple the front wheels 14 with the axle 34. The front wheels 14 are linked together by a pair of tie rods 42 and a center-pivot plate member 44. The center-pivot member 44 pivots about a connection 45 with the axle 34 located near the centerline of the vehicle 10. A hydraulic cylinder 46 that is operatively coupled with the steering wheel 18 is connected with the front center-pivot member 44 for swinging the center-pivot 44 in an arc about a vertical axis defined by its connection 45 with the axle 34. As the operator turns the steering wheel 18, the hydraulic cylinder 46 shifts the front center-pivot 44 about its connection 45 to the axle 34. The tie rods 42 shift as the center-pivot 44 shifts, and act to shift respective arms 40 of the pivotal wheel support mechanisms 38. As the arms 40 pivot, the front wheels 14 pivot therewith to execute a turn.

Figure 4:
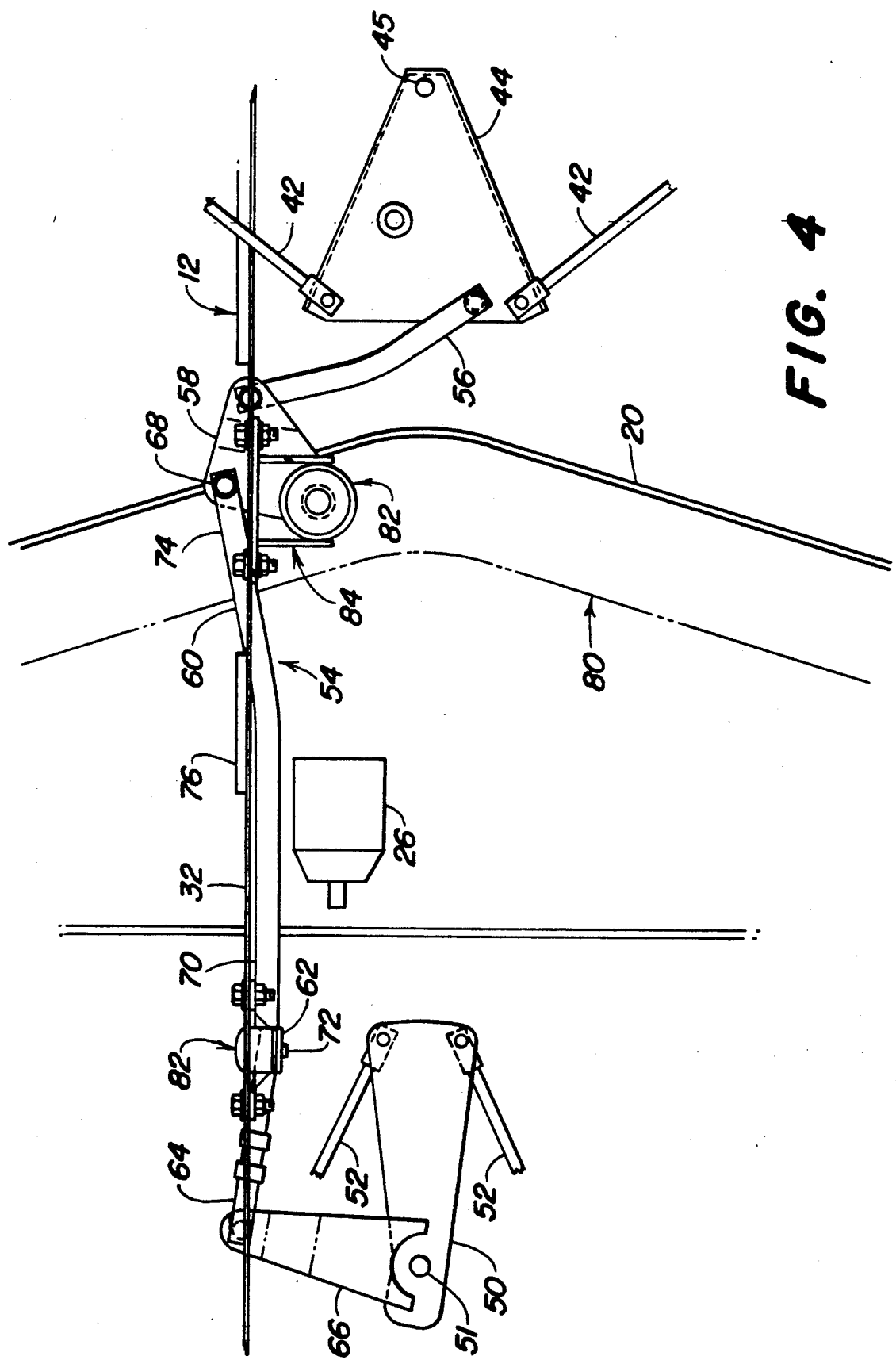
FIG. 4 is a partial plan view of the steering linkage according to the present invention.
Figure 5:
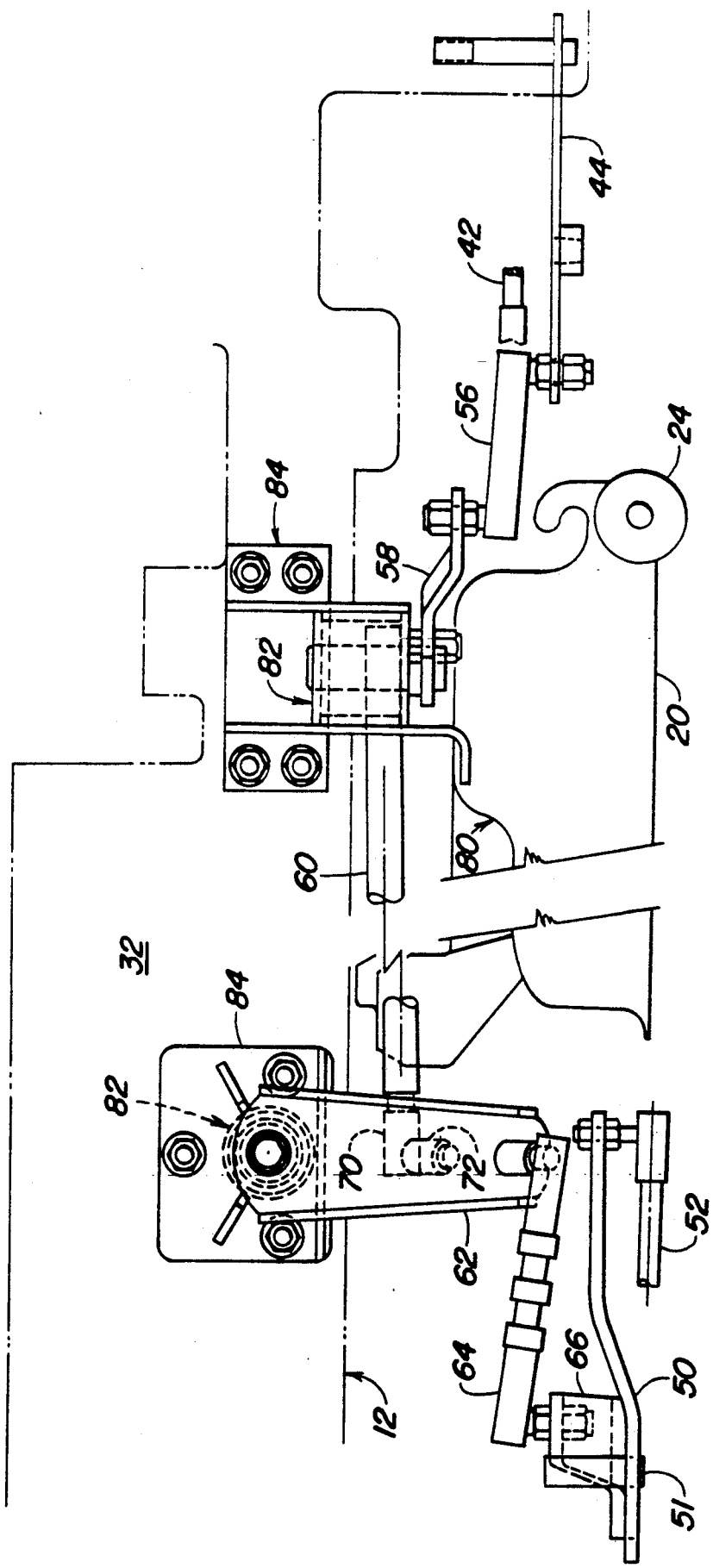
FIG. 5 is a partial side view of the steering linkage according to the present invention.

Referring now to FIG. 4, there is shown a partial plan view of the steering mechanism according to the preferred embodiment of the present invention. A rear center-pivot member 50 is coupled with the frame 12 for pivoting about a vertical axis 51 near the centerline of the vehicle 10. Rear tie rods 52 extend from the rear center-pivot member 50 to respective rear arms (not shown) of pivotal wheel support mechanisms. Similar to the structure provided at the front of the vehicle 10, the rear wheels 16 pivot about the generally vertical axis defined by the pivotal wheel support mechanisms in response to the rear tie rods 52 shifting the arms as the rear center-pivot member 50 swings.

A linkage mechanism 54, as seen in FIG. 4, is provided for transmitting pivotal motion between the front and rear center-pivot members 44 and 50 when the steering wheel 18 is turned by the operator. A first rod member 56 is pivotally coupled with the front center-pivot member 44 and extends beneath the left portion of the vehicle 10. A bell crank or first swing member 58 is coupled with the frame 12 for pivoting about a vertical axis. A second rod member 60 pivotally extends across the deck 20 and between the first swing member 58 and a second swing member 62 that is carried by the frame 12 for swinging about a horizontal axis. A third rod member 64 extends between the second swing member 62 and a lever portion 66 of the rear center-pivot member 50.

As the operator turns the steering wheel 18 in the operator station, the hydraulic cylinder 46 shifts the front center-pivot 44. The front tie rods 42 thereattached shift to pivot the arms 40 of the pivotal front wheel supports 38 and thereby cause the front wheels 14 to turn. The linkage 54 acts to couple the front center-pivot member 44 with the rear center-pivot member 50 such that the front and rear pairs of wheels 14 and 16 pivot in opposite directions to execute a turn of smaller radius. As the front center-pivot member 44 pivots, the first rod 56 shifts, thereby pivoting the first swing member 58 about its vertical pivot axis. The second rod 60 shifts in response to the pivoting of the first swing member 58, and therefore causes the second swing member 62 to pivot about its horizontal pivot axis. The third rod 64 shifts with the second swing member 62 and therefore pivots the lever portion 66 of the rear center-pivot member 50. The rear tie rods 52 shift in response to the swinging of the rear center-pivot member 50, and the rear wheels 16 pivot accordingly. The linkage 54 therefore acts as a means for turning the rear pair of wheels 16 as the front pair of wheels 14 turn in order to execute a relatively tight turn. The geometry and length of the tie rods can be arranged such that the rear pair of wheels 16 pivot through a smaller angle than the front wheels 14.

The frame 12 includes a pair of longitudinally extending and laterally spaced structural members 30 and 32. The first and second swing members 58 and 62 are each pivotally coupled with the structural member 32 on the left side of the vehicle. The linkage 54 according to the preferred embodiment therefore extends rearwardly proximate the left side structural member 32, and does not interfere with mechanisms that are located nearer the centerline of the vehicle 10, ie. the gear box 26 or a longitudinally extending drive shaft. Furthermore, the gear box 26 carried by the deck 20 near the centerline of the vehicle 10 requires clearance in order for the deck 20 to be removed or slid from beneath the vehicle 10. Since the linkage mechanism 54 is positioned to one side of the vehicle 10 near the left side structural member 32, the mower deck 20 and components thereattached can be removed from the other side without being blocked by the linkage mechanism 54.

During steering operation, the linkage mechanism 54 according to the preferred embodiment shifts such that an amount of space or clearance is required by the linkage 54 during execution of the turn. The second rod member 60 extends generally longitudinally and across the mower deck 20. When the vehicle 10 is steered, the second rod 60 therefore shifts generally along its axis and longitudinally with respect to the vehicle 10. The first and second swing members 58 and 62 are coupled at respective ends of the second rod 60 and are pivotally coupled to the frame 12 for swinging motion about respective axes. According to the preferred embodiment of the present invention, the longitudinal axis of the second rod 60, and the pivot axes of the first and second swing members 58 and 62 are positioned at approximately ninety degree angles to one another, or generally orthoganally. As the first swing member 58 pivots during steering, the second rod's forward connection point 68 to the first swing member 58 shifts laterally as well as longitudinally due to the orientation of the arc through which the first swing member 58 shifts. However, lateral motion of the rear portion 70 of the second rod member 60 is restricted, since the second swing member 62 is not adapted to pivot about a vertical axis. Therefore, relatively little lateral clearance is required by the rear portion 70 of the second rod member 60 as the vehicle 10 executes a turn. More lateral clearance would be required by the second rod's rear portion 70 if the second swing member 62 pivoted about a vertical axis as does the first swing member 58.

The connection point 72 of the second rod 60 to the second swing member 62 shifts vertically as well as longitudinally with respect to the vehicle 10 as the vehicle 10 executes a turn, due to the orientation of the arc that the second swing member 62 shifts through. However, vertical motion of the front portion 74 of the second rod member 60 is restricted since the first swing member 58, to which the second rod member's front portion 74 is pinned, is not adapted to pivot about a horizontal axis. The second rod's front portion 74 therefore shifts only slightly horizontally during a turn. Therefore, relatively little vertical clearance is required by the front portion 74 of the second rod member as the vehicle 10 executes a turn. More vertical clearance would be required for the second rod's front portion 74 if the first swing member 58 pivoted about a horizontal and laterally extending axis. Since the rear portion 70 of the second rod 60 shifts only slightly laterally during operation, the second rod 60 can be positioned within the relatively narrow space defined between the gear box 26 and a draft plate 76 coupled with the frame 12. The draft plate 76 supports draft arms (not shown) that carry the deck 20 beneath the vehicle 10.

The longitudinal axis of the second rod member 60 and the axes of pivot of the first and second swing members 58 and 62 extend at approximately ninety degrees to one another. Each swing member 58 and 62 causes a respective end portion 70 or 74 of the second rod member 60 to shift in primary and secondary directions, i.e. the first swing member 58 shifts the second rod 60 longitudinally as well as slightly laterally, and the second swing member 62 shifts the second rod 60 longitudinally as well as slightly vertically. Therefore, both swing members 58 and 60 shift the second rod 60 in the primary or longitudinal direction, which acts to operatively shift the center-pivot members 44 and 50 during execution of a turn. The swing members 58 and 62 also cause the end portions 70 and 74 of the second rod 60 to shift in secondary directions. The secondary shifting must not interfere with the operation of the deck 20 or vehicle 10. The present invention allows respective end portions 70 and 74 of the second rod 60 to shift generally within different planes. The front portion 74 of the second rod 60 shifts in a generally horizontal plane, and therefore maintains a large amount of clearance for the chute portion 80 of the deck 20 to be raised to its highest position. The rear portion 70 of the second rod 60 shifts in a generally vertical plane without shifting substantially laterally. The rear portion 70 of the second rod 60 according to the preferred embodiment therefore does not interfere with the operation of vehicle components such as the gear box 26 or draft plate 76 that are laterally spaced only a short distance from the second rod 60

The preferred embodiment as described above includes a chute 80 formed in the front portion of the deck 20, said deck 20 being shiftable upwardly such that the front portion 74 of the second rod 60 must provide clearance for the chute 80. The preferred embodiment also includes a gear box 26 and draft plate 76 that define a relatively narrow space therebetween through which the rear portion 70 of the second rod 60 is positioned. However, the present invention may also be utilized on a vehicle having other components for which the linkage 54 must provide clearance during operation. Also, the linkage 54 according to the preferred embodiment extends rearwardly near the left structural member 32. However, the linkage could also be arranged proximate the right structural member 30 according to the present invention, particularly if the deck and components thereattached were adapted to be removed from beneath the vehicle 10 from the left side.

The swing members 58 and 62 are coupled with the vehicle frame 12 via pivot mechanisms 82. The pivot mechanisms 82 include bracket structures 84 that support bearings within which the swing members 58 and 62 pivot.

I claim:

1. A vehicle having a frame, said vehicle comprising:
   a pair of front wheels for supporting a portion of the frame, said front pair of wheels being pivotal to steer the vehicle;
   a pair of rear wheels for supporting a portion of the frame, said rear pair of wheels being pivotal to steer the vehicle;
   a mower deck operatively carried beneath the vehicle frame and between the front and rear pairs of wheels;
   front and rear center-pivot members pivotally carried by the frame for steering the respective front and rear pairs of wheels;
   a linkage means operatively coupling the front and rear center-pivot members for transmitting pivotal motion therebetween, said linkage means further including:
      first, second and third rod members operatively coupling the front center-pivot member with the rear center-pivot member for transferring pivotal motion therebetween, wherein the second rod member has an axis that extends generally longitudinally with respect to the vehicle and over the mower deck;
      front and rear swing members coupled at respective ends of the second rod member and carried by the frame to pivot about respective pivot axes, said first rod member being coupled with the front swing member for transferring pivotal motion between the front center-pivot member and the front swing member, said third rod being coupled with the rear swing member for transferring pivotal motion between the rear swing member and the rear center-pivot member, said second and third rod members being coupled generally directly to the rear swing member, wherein the longitudinal axis of the second rod and the pivot axes of the front and rear swing members extend at approximately ninety degree angles to one another, said pivot axis of the front swing member extending generally vertically and said pivot axis of the rear swing member extending generally horizontally.

2. The invention of claim 1 wherein the second rod member extends substantially across the longitudinal length of the mower deck.

3. The invention of claim 1, wherein:
   the rear swing member further includes a top portion pivotally coupled with the frame, a bottom portion spaced beneath the top portion and to which the third rod is coupled, and a middle portion located between the top and bottom portions and to which the second rod member is coupled.

4. A vehicle having a frame, said vehicle comprising:
   a pair of front wheels for supporting a portion of the frame, said front pair of wheels being pivotal to steer the vehicle;
   a pair of rear wheels for supporting a portion of the frame, said rear pair of wheels being pivotal to steer the vehicle;
   a mower deck operatively carried beneath the vehicle frame and between the front and rear pairs of wheels;
   front and rear center-pivot members pivotally operatively carried by the frame at respective points located proximate the centerline of the vehicle;
   a pair of front tie rods extending between the front center-pivot member and respective front wheels for pivoting said wheels as the front center-pivot member pivots;
   a pair of rear tie rods extending between the rear center-pivot member and respective rear wheels for pivoting said wheels as the rear center-pivot member pivots;
   a linkage means operatively coupling the front and rear center-pivot members for transmitting pivotal motion between the front and rear center-pivot members, said linkage means further including:
      first, second and third rod members operatively coupling the front center-pivot member with the rear center-pivot member, and shiftable to pivot the center-pivot members simultaneously, wherein said second rod member has an axis that extends generally longitudinally with respect to the vehicle and over the mower deck;
      front and rear swing members coupled at respective ends of the longitudinally extending rod member and carried by the frame to pivot about respective pivot axes, said second and third rod member being coupled directly to the rear swing member, and wherein the pivot axes of the front and rear swing members and the longitudinal axis of the rod positioned therebetween extended at approximately ninety degree angles to one another, the pivot axis of the front swing member extending generally vertically and the axis of the rear swing member extending generally horizontally.

5. The invention of claim 4, wherein:
   said first rod member extends between the front center-pivot member and the front swing member;
   said second rod member extends between the front and rear swing members, and extends generally longitudinally with respect to the vehicle and over the mower deck; and
   said third rod member is coupled between the rear swing member and the rear center-pivot member.

6. The invention of claim 5 wherein the second rod member extends substantially across the longitudinal length of the mover deck.

7. The invention of claim 5 and further including a steering wheel mechanism controllable by the operator, said steering wheel being coupled directly to the front center pivot member for pivotally shifting the front center pivot member.

8. The invention of claim 5, wherein the frame further includes a plurality of longitudinally extending and laterally spaced structural members, said front and rear swing members being pivotally carried by the same one of the structural members.

9. The invention of claim 5, wherein:
the rear swing member further includes a top portion pivotally coupled with the frame, a bottom portion spaced beneath the top portion and to which the third rod is coupled, and a middle portion located between the top and bottom portions and to which the second rod member is coupled.

10. A vehicle having a frame, said vehicle comprising:
a pair of front wheels for supporting a portion of the frame, said front pair of wheels being pivotal to steer the vehicle;
a pair of rear wheels for supporting a portion of the frame, said rear pair of wheels being pivotal to steer the vehicle;
a mower deck operatively carried beneath the vehicle frame and between the front and rear pairs of wheels;
front and rear center-pivot members operatively and pivotally carried by the frame at respective points located proximate the centerline of the vehicle;
a pair of front tie rods extending between the front center-pivot member and respective front wheels for pivoting said wheels as the front center pivot member pivots;
a pair of rear tie rods extending between the rear center-pivot member and respective rear wheels for pivoting said wheels as the rear center-pivot member pivots;
a linkage means operatively coupling the front and rear center-pivot members for transmitting pivotal motion between the front and rear center-pivot members, said linkage means including:
a first rod member coupled with the front pivot member;
a front swing member swingably carried by the frame and coupled with the first rod member for swinging about a vertical axis as the front center-pivot member pivots;
a second rod member coupled with the front swing member;
a rear swing member carried by the frame and coupled with the second rod member for pivotal motion about a horizontal axis; and
a third rod member coupled between the rear swing member and the rear center pivot member,
wherein the longitudinal axis of the second rod and the pivot axes of the front and rear swing members extend at approximately ninety degree angles to one another,
a steering wheel mechanism controllable by the operator, said steering wheel mechanism being coupled directly to the front center pivot member for pivotally shifting the front center pivot member.

11. The invention of claim 10, wherein the frame further includes a pair of longitudinally extending and laterally spaced structural members, said front and rear swing members being pivotally carried by the same one of the structural members for supporting the second rod member in close proximity to the structural member which carries the front and rear swing members.

12. The invention of claim 10, wherein:
the rear member further includes a top portion pivotally coupled with the frame, a bottom portion spaced beneath the top portion and to which the second rod is coupled, and a middle portion located between the top and bottom portions and to which the third rod member is coupled.

13. The invention of claim 10, wherein the second rod member extends generally longitudinally and substantially across the mower deck.

14. A vehicle, said vehicle comprising:
a frame having a pair of longitudinally extending and laterally spaced structural members,
an engine carried by a front portion of the frame,
a pair of front wheels for supporting a portion of the frame, said front pair of wheels being pivotal to steer the vehicle;
a pair of rear wheels for supporting a portion of the frame, said rear pair of wheels being pivotal to steer the vehicle;
a mower deck operatively carried beneath the vehicle frame and between the front and rear pairs of wheels;
front and rear center pivot members operatively and pivotally carried by the frame at respective points located proximate the centerline of the vehicle, said rear center pivot member including a lever portion that extends outwardly from the rear center pivot member;
a steering mechanism pivotable by the operator, said steering mechanism being coupled with the front center pivot member for pivotally shifting the front center pivot member;
a pair of front tie rods extending between the front center pivot member and respective front wheels for pivoting said wheels as the front center pivot member pivots;
a pair of rear tie rods extending between the rear center pivot member and respective rear wheels for pivoting said wheels as the rear center pivot members pivots;
a linkage means operatively coupling the front and rear center pivot members for transmitting pivotal motion between the front and rear center pivot members, said linkage being carried generally beneath the frame and generally beneath the engine, said linkage means including:
a first rod member coupled with the front pivot member;
a front swing member swingably carried by one of the longitudinally extending structural members of the frame and coupled with the first rod member for swinging about a vertical axis as the front center pivot member pivots;
a second rod member coupled with the front swing member and extending substantially across and above the longitudinal length of the mower deck;
a rear swing member carried by the same structural member of the frame as the front swing member and coupled directly to the second rod member for pivotal motion about a horizontal axis, said rear swing member having tope middle and bottom portions, said top portion being swingably coupled to the structural member, and said middle portion being coupled with the second rod member; and a third rod member extending between and coupled directly to the bottom portion of the rear swing member and the level portion of the rear center pivot member.

* * * * *

UNITED STATES PATENT AND TRADEMARK OFFICE
CERTIFICATE OF CORRECTION

PATENT NO. : 5,174,595

DATED : 29 December 1992

INVENTOR(S) : Terry Lee Snipes

It is certified that error appears in the above-identified patent and that said Letters Patent is hereby corrected as shown below:

Column 8, line 68, delete "mover" and insert therefor --mower--.

Column 10, line 6, after "rear" insert --swing--.

Column 10, line 67, delete "tope" and insert therefor --top--.

Signed and Sealed this

Seventh Day of December, 1993

*Attest:*

BRUCE LEHMAN

*Attesting Officer*  Commissioner of Patents and Trademarks